(12) United States Patent
Atov et al.

(10) Patent No.: US 12,355,661 B2
(45) Date of Patent: *Jul. 8, 2025

(54) CONVERGENCE FOR TIME SENSITIVE CLOUD APPLICATIONS

(71) Applicant: MICROSOFT TECHNOLOGY LICENSING, LLC, Redmond, WA (US)

(72) Inventors: Irena Atov, Redmond, WA (US); Somesh Chaturmohta, Redmond, WA (US); Rui Liang, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/423,158

(22) Filed: Jan. 25, 2024

(65) Prior Publication Data

US 2024/0163205 A1    May 16, 2024

Related U.S. Application Data

(63) Continuation of application No. 17/589,883, filed on Jan. 31, 2022, now Pat. No. 11,924,089.

(51) Int. Cl.
*H04L 45/00* (2022.01)
*H04L 45/302* (2022.01)
*H04L 45/74* (2022.01)
*H04L 61/5007* (2022.01)
*H04L 69/40* (2022.01)

(52) U.S. Cl.
CPC ............ *H04L 45/306* (2013.01); *H04L 45/22* (2013.01); *H04L 45/74* (2013.01); *H04L 61/5007* (2022.05)

(58) Field of Classification Search
None
See application file for complete search history.

(56) References Cited

U.S. PATENT DOCUMENTS

| | | | |
|---|---|---|---|
| 9,241,271 B2* | 1/2016 | Wiley | H04W 12/088 |
| 2008/0049777 A1* | 2/2008 | Morrill | H04L 67/141 |
| | | | 370/420 |
| 2012/0127881 A1* | 5/2012 | Wiley | H04L 45/70 |
| | | | 370/252 |
| 2014/0064086 A1* | 3/2014 | Wiley | H04L 45/70 |
| | | | 370/235 |
| 2014/0297847 A1* | 10/2014 | Heinz | H04L 43/0852 |
| | | | 709/224 |

(Continued)

*Primary Examiner* — Christopher B Robinson
(74) *Attorney, Agent, or Firm* — Han Gim; Newport IP, LLC

(57) ABSTRACT

Failover functionality is by identifying at least two network paths for a media communications session between a virtual machine at a computing environment and a client application. Unique Internet Protocol (IP) addresses are assigned for the at least two network paths. Based on application and network metrics at the computing environment, a network condition at the computing environment is determined that is indicative of a performance degradation of the media communications session. A signal is communicated to the client service indicating a switch to a second path of the at least two network paths and a second of the unique IP addresses.

20 Claims, 10 Drawing Sheets

(56) References Cited

U.S. PATENT DOCUMENTS

| | | | | |
|---|---|---|---|---|
| 2015/0007180 A1* | 1/2015 | Sharp | ................ | G06F 11/3495 |
| | | | | 718/1 |
| 2017/0302722 A1* | 10/2017 | Porokh | ................ | H04L 65/70 |
| 2019/0171491 A1* | 6/2019 | Das | ................ | G06F 9/5077 |
| 2022/0244980 A1* | 8/2022 | Anderson | ................ | G06F 9/546 |

* cited by examiner

CONVERGENCE FOR TIME SENSITIVE CLOUD APPLICATIONS

REFERENCE TO PRIORITY APPLICATION

This application is a continuation of U.S. patent application Ser. No. 17/589,883, filed Jan. 31, 2022, the content of which application is hereby expressly incorporated herein by reference in its entirety.

BACKGROUND

A data center may house computer systems and various networking, storage, and other related components. Data centers may, for example, be used by service providers to provide computing services to businesses and individuals as a remote computing service or provide "software as a service" (e.g., cloud computing). When the data center experiences network connectivity issues, poor network performance may result, resulting in lost data, or users being unable to provide quality services to their downstream customers, which may result in lost revenue and customer dissatisfaction. For example, there are a number of systems and applications that provide real-time communications services that can be adversely affected by poor network conditions, such as dropped meetings and calls, or interrupted gaming sessions. Troubleshooting network connectivity issues may be difficult to perform and correct in a timely manner, given the complexity of the networks in data centers. Production loss and inefficiencies with respect to computing resources can be exacerbated when the data center is unable to quickly isolate and correct the cause of a connectivity issue.

It is with respect to these considerations and others that the disclosure made herein is presented.

SUMMARY

Many real-time communications services such as collaboration systems or cloud gaming applications can exhibit poor performance from deteriorating network conditions which can result in, for example, meeting/call drops or gaming sessions being lost. The present disclosure provides the capability to sustain existing connections and maintain the state of a service during unplanned outages on the network or during overloaded network scenarios.

For example, in the case of real-time communications services (e.g., MS Teams), a signal may be provided to the application or service running at the service provider. The signal may indicate when a connection should be moved and where it is safe to move the connection. In this way, the retargeting infrastructure of the application or service may be leveraged in a way that improves high availability objectives and the end-user experience with minimal architectural changes and reduced implementation costs. As used herein, an application or service may run on virtual machines or containers that are provided by the service provider. Examples of applications or services include real-time collaboration applications such as Teams or Zoom, or various gaming applications.

The described techniques can allow for service providers to deliver seamless services while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
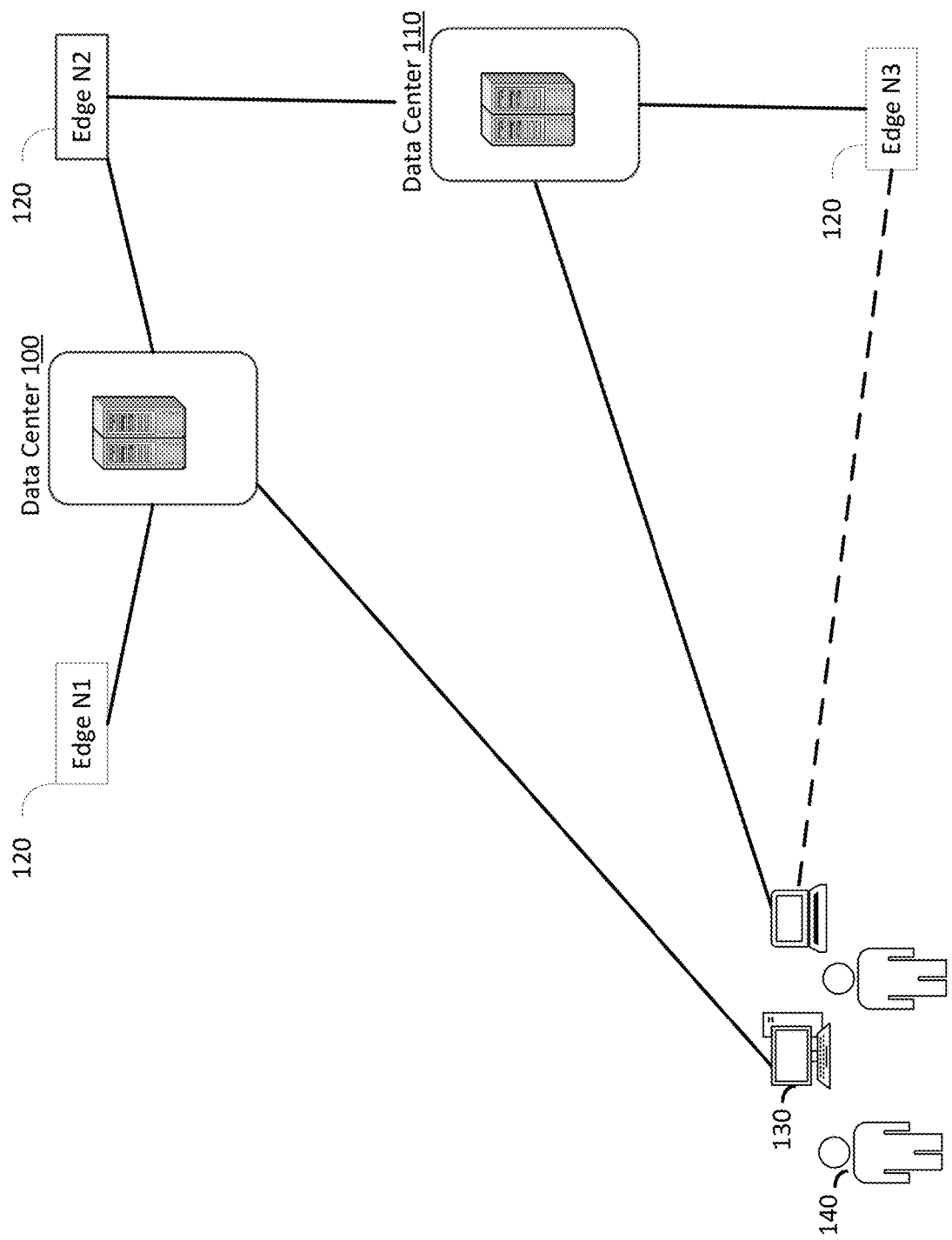
FIG. 1 is a diagram illustrating an example architecture in accordance with the present disclosure.

The disclosed embodiments provide a way for service providers to deliver information to applications as to when and where to move a given service to enable failover of the host endpoint and/or the data path across the edge/peering point to ensure that quality of service is maintained during unplanned outages and overloaded network scenarios. For example, in the case of real-time communications services applications (e.g., MS Teams), a signal may be provided to the application that indicates when a connection should be moved and where it is safe to move the connection. In this way, the retargeting infrastructure of the application may be leveraged in a way that improves high availability objectives and customer experience with minimal architectural changes and reduced implementation costs. As used herein, "application" may refer to the application or service that is being hosted by the service provider. The application may be implemented, for example, as one or more microservices that are deployed on virtual machines or containers running at a data center.

While some multipath solutions exist, these solutions have not been beneficial to real-time communications services due to slow path convergence (e.g., IP-based network path convergence can take 15 minutes which does not support real-time requirements). The present disclosure provides a way to expose multiple IP addresses on the host, injecting unique protocol extensions, and correlating various network signals to enable fast convergence and data path control. Fast convergence and data path control enables a variety of capabilities such as sustaining media sessions in a variety of network conditions, and defining multiple levels of service availability and quality. In addition, the disclosed multipath mechanism provides the ability to regulate Internet backhaul costs which allows for further optimization of the cost-performance curve. For example, cost savings may be realized where less expensive paths to the customer can be utilized when within the limits of performance objectives.

While the disclosed embodiments are described in the context of high availability implementations for real time communications services, the described techniques are extendible and generalizable to other applications, such as online gaming and other interactive applications. The disclosed embodiments may reduce convergence/recovery time when the primary path to a host endpoint (e.g., a conferencing server or media processor (MP)) is traversing an overloaded or faulty network segment and is either becoming fully unavailable (e.g., causing call setup drops or mid-call drops) or degrading the performance of the service (e.g., high packet loss, delay). By switching to a secondary backup path when the primary path fails, or by switching to a new server if the main hosting server fails, fast convergence can be reached to preserve established meetings/calls or other sessions, as well as to successfully establish new meetings/calls or sessions that would otherwise be lost in such failure scenarios. The disclosed embodiments can allow for meetings/calls to avoid connection failures and find an available path or server to take over the meeting state and maintain established connections. The time to recovery after a failure in the core backbone and across the Internet is becoming a critical requirement for users, especially for time sensitive real-time communications applications. The disclosed embodiments can improve service availability, and in some embodiments allow for a premium service class that can provide guaranteed availability.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

Figure 2:
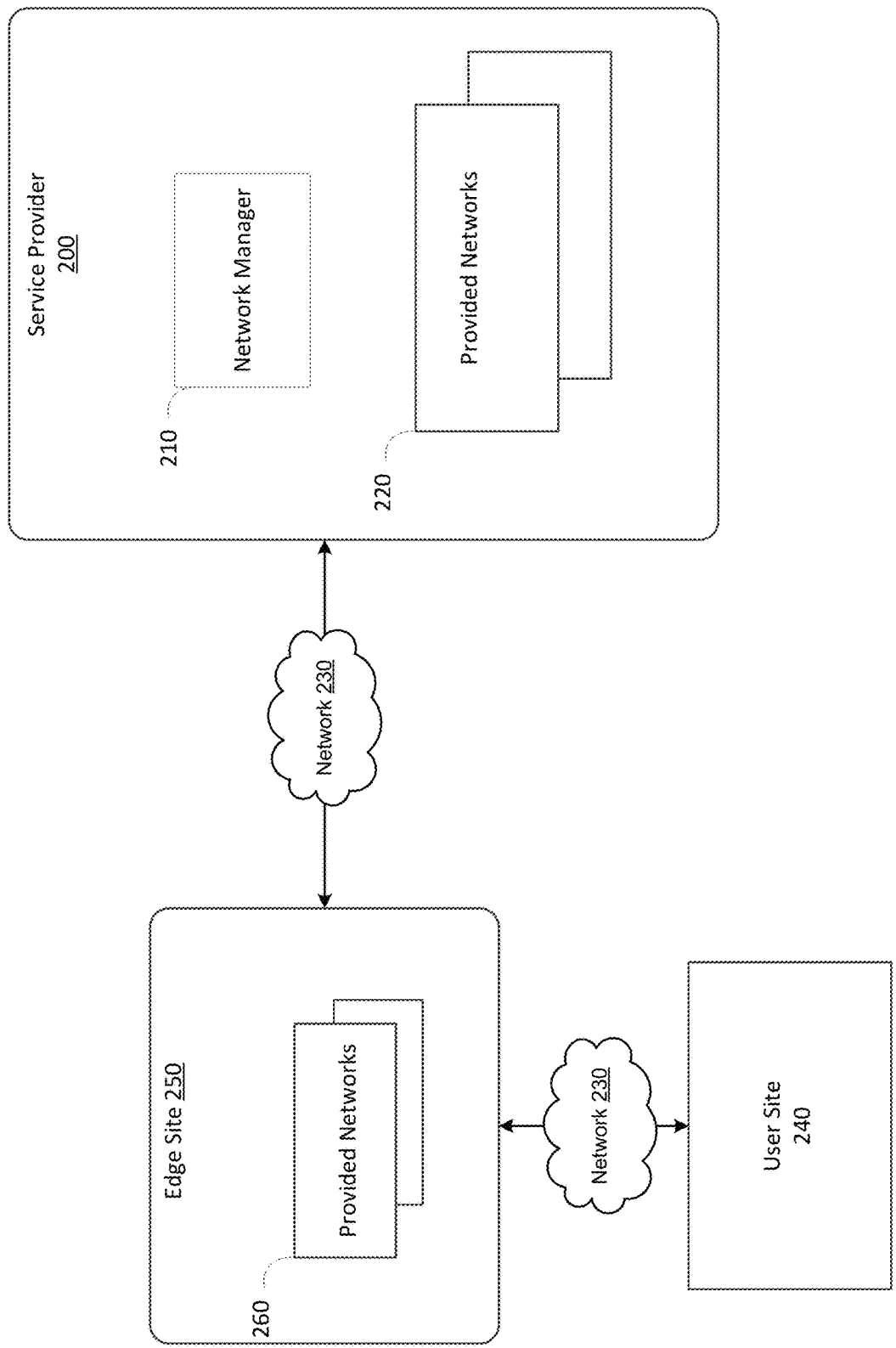
FIG. 2 is a diagram illustrating an example architecture in accordance with the present disclosure.

FIG. 2 illustrates an example computing environment in which the embodiments described herein may be implemented. FIG. 2 illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 210.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

FIG. 2 illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
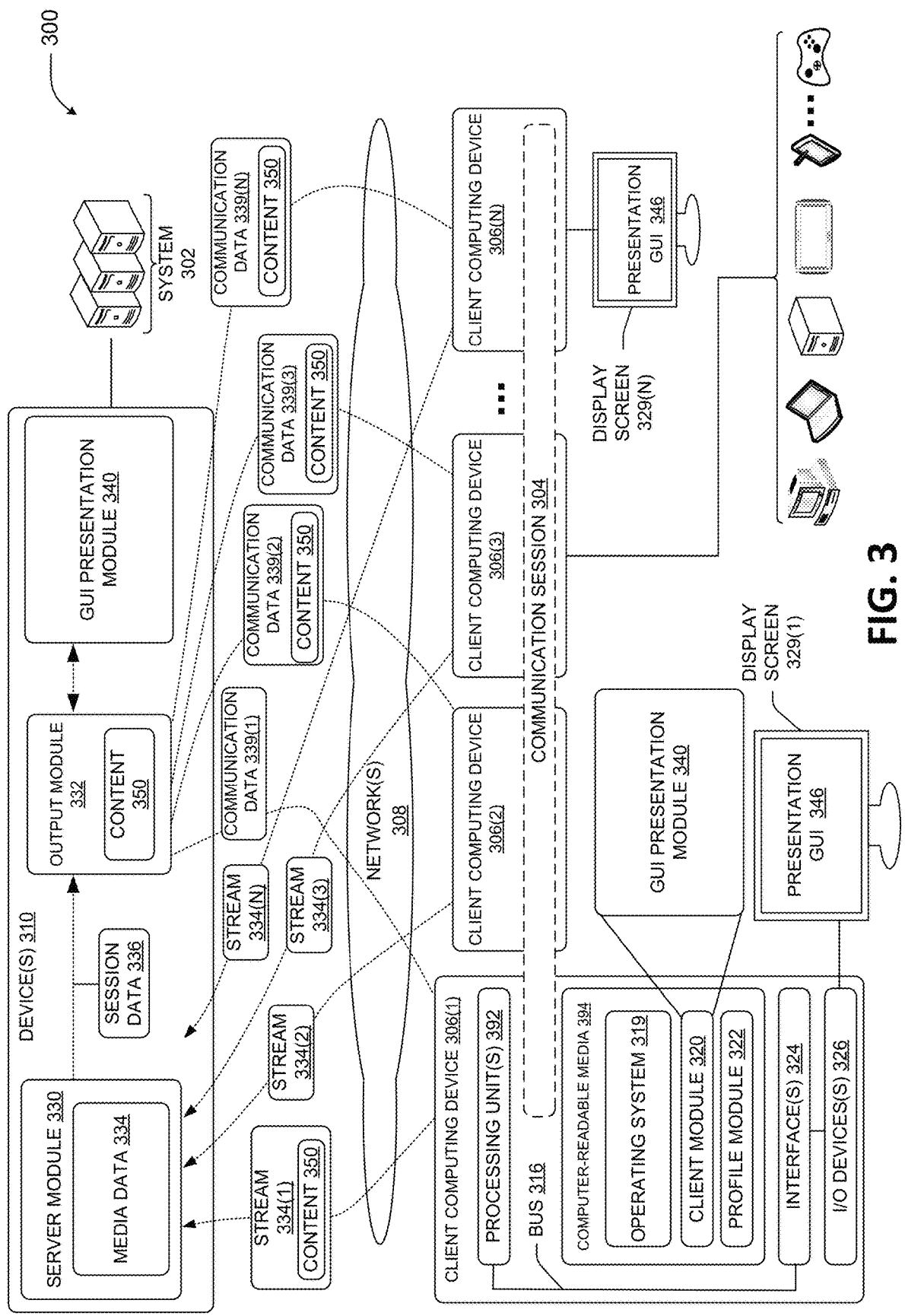
FIG. 3 is a diagram illustrating a data center in accordance with the present disclosure.

FIG. 3 is a diagram illustrating an example environment 300 in which a system 302 can implement the techniques disclosed herein. In some implementations, a system 302 may function to collect, analyze, and share content that is displayed to users of a communication session 304. As illustrated, the communication session 304 may be implemented between a number of client computing devices 306(1) through 306(N) (where N is a number having a value of two or greater) that are associated with the system 302 or are part of the system 302. The client computing devices 306(1) through 306(N) enable users to participate in the communication session 304. Although some examples show one of the computers 306 processing aspects of the present techniques, it can be appreciated that the techniques disclosed herein can be applied to other computing devices and are not to be construed as limiting.

In this example, the communication session 304 is hosted, over one or more network(s) 308, by the system 302. That is, the system 302 can provide a service that enables users of the client computing devices 306(1) through 306(N) to participate in the communication session 304 (e.g., via a live viewing and/or a recorded viewing). Consequently, a "participant" to the communication session 304 can comprise a user and/or a client computing device (e.g., multiple users may be in a room participating in a communication session via the use of a single client computing device), each of which can communicate with other participants. As an alternative, the communication session 304 can be hosted by one of the client computing devices 306(1) through 306(N) utilizing peer-to-peer technologies. The system 302 can also host other team collaboration functionality (e.g., as part of an application suite).

In the examples described herein, client computing devices 306(1) through 306(N) participating in the communication session 304 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 304 live as activity occurs, or alternatively, via a recording at a later time after the activity occurs. In examples described herein, client computing devices 306(1) through 306(N) participating in the communication session 304 are configured to receive and render for display, on a user interface of a display screen, communication data. The communication data can comprise a collection of various instances, or streams, of live and/or recorded content. Accordingly, the various streams of content within the communication data enable a meeting or a broadcast presentation to be facilitated amongst a group of people dispersed across remote locations. Each stream can also include text, audio and video data, such as the data communicated within a channel, chat board, or a private messaging service.

The system 302 includes device(s) 310. The device(s) 310 and/or other components of the system 302 can include distributed computing resources that communicate with one another and/or with the client computing devices 306(1) through 306(N) via the one or more network(s) 308. In some examples, the system 302 may be an independent system that is tasked with managing aspects of one or more communication sessions such as communication session 304. As an example, the system 302 may be managed by entities such as SLACK, WEBEX, GOTOMEETING, GOOGLE HANGOUTS, etc. In some embodiments, some or all of system 302 may be implemented in a virtualized computing environment. For example, at least some functions of system 302 may be implemented a microservices instantiated in a cloud computing environment.

Network(s) 308 may include, for example, public networks such as the Internet, private networks such as an institutional and/or personal intranet, or some combination of private and public networks. Network(s) 308 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 308 may utilize communications protocols, including packet-based and/or datagram-based protocols such as Internet protocol ("IP"), transmission control protocol ("TCP"), user datagram protocol ("UDP"), or other types of protocols. Moreover, network(s) 308 may also include a number of devices that facilitate network communications and/or form a hardware basis for the networks, such as switches, routers, gateways, access points, firewalls, base stations, repeaters, backbone devices, and the like.

In some examples, network(s) 308 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.6 standards (e.g., 802.6g, 802.6n, 802.6ac and so forth), and other standards.

In various examples, device(s) 310 may include one or more computing devices that operate in a cluster or other grouped configuration to share resources, balance load, increase performance, provide fail-over support or redundancy, or for other purposes. For instance, device(s) 310 may belong to a variety of classes of devices such as traditional server-type devices, desktop computer-type devices, and/or mobile-type devices. Thus, although illustrated as a single type of device or a server-type device, device(s) 310 may include a diverse variety of device types and are not limited to a particular type of device. Device(s) 310 may represent, but are not limited to, server computers, desktop computers, web-server computers, personal computers, mobile computers, laptop computers, tablet computers, or any other sort of computing device.

A client computing device (e.g., one of client computing device(s) 306(1) through 306(N)) may belong to a variety of classes of devices, which may be the same as, or different from, device(s) 310, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 306(1) through 306(N) of the various classes and device types can represent any type of computing device having one or more data processing unit(s) 392 operably connected to computer-readable media 394 such as via a bus 316, which in some instances can include one or more of a system bus, a data bus, an address bus, a PCI bus, a Mini-PCI bus, and any variety of local, peripheral, and/or independent buses.

Executable instructions stored on computer-readable media 394 may include, for example, an operating system 319, a client module 320, a profile module 322, and other modules, programs, or applications that are loadable and executable by data processing units(s) 392.

Figure 6:
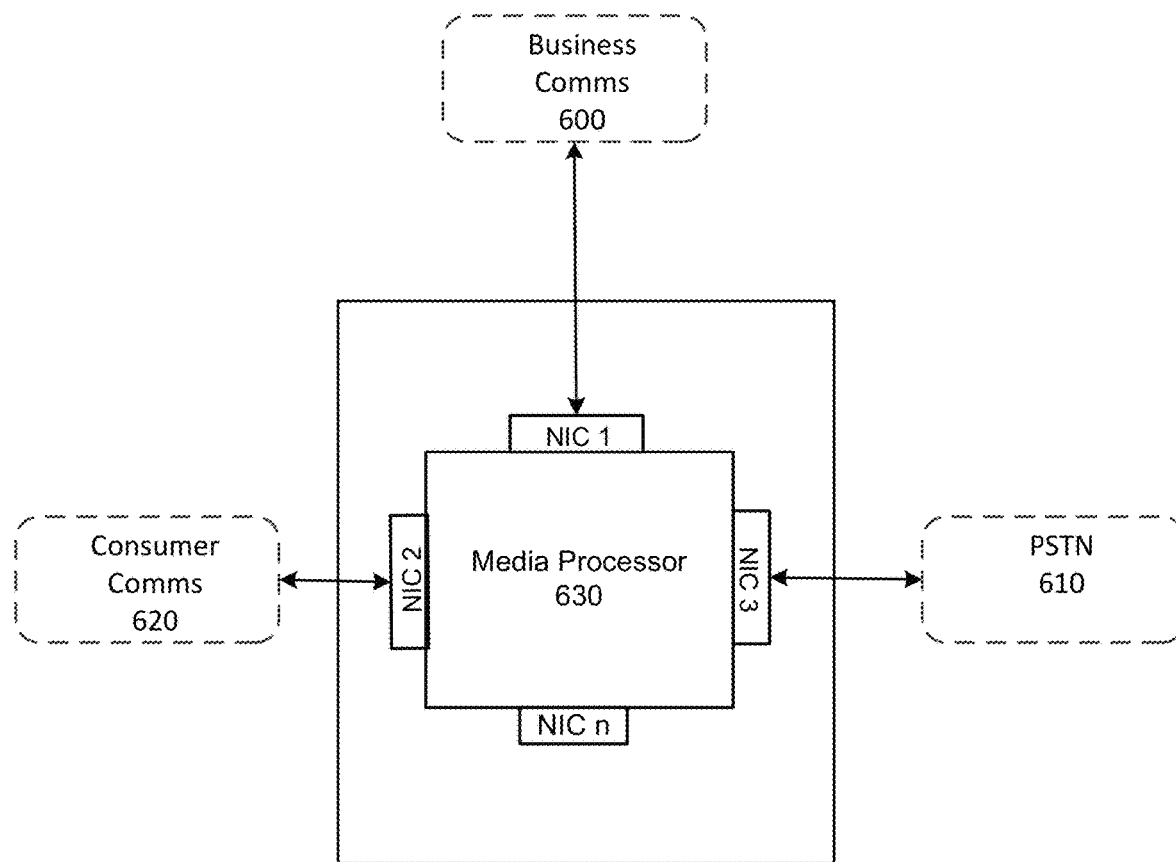
FIG. 6 is a diagram illustrating an architecture for an example media processor in accordance with the present disclosure.

Client computing device(s) 306(1) through 306(N) (which are also referred to herein as computing devices 104A-104N) may also include one or more interface(s) 324 to enable communications between client computing device(s) 306(1) through 306(N) and other networked devices, such as device(s) 310, over network(s) 308. Such network interface(s) 324 may include one or more network interface controllers (NICs) or other types of transceiver devices (not shown in FIG. 6) to send and receive communications and/or data over a network. Moreover, client computing device(s) 306(1) through 306(N) can include input/output ("I/O") interfaces (devices) 326 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 306(1) is in some way connected to a display device (e.g., a display screen 329(1)), which can display a UI according to the techniques described herein.

In the example environment 300 of FIG. 3, client computing devices 306(1) through 306(N) may use their respective client modules 320 to connect with one another and/or other external device(s) in order to participate in the communication session 304, or in order to contribute activity to a collaboration environment. For instance, a first user may utilize a client computing device 306(1) to communicate with a second user of another client computing device 306(2). When executing client modules 320, the users may share data, which may cause the client computing device 306(1) to connect to the system 302 and/or the other client computing devices 306(2) through 306(N) over the network(s) 308.

As shown in FIG. 3, the device(s) 310 of the system 302 include a server module 330 and an output module 332. In this example, the server module 330 is configured to receive, from individual client computing devices such as client computing devices 306(1) through 306(N), media streams 334(1) through 334(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 330 is configured to receive a collection of various media streams 334(1) through 334(N) during a live viewing of the communication session 304 (the collection being referred to herein as "media data 334"). In some scenarios, not all of the client computing devices that participate in the communication session 304 provide a media stream. For example, a client computing device may only be a consuming, or a "listening", device such that it only receives content associated with the communication session 304 but does not provide any content to the communication session 304.

In various examples, the server module 330 can select aspects of the media streams 334 that are to be shared with individual ones of the participating client computing devices 306(1) through 306(N). Consequently, the server module 330 may be configured to generate session data 336 based on the streams 334 and/or pass the session data 336 to the output module 332. Then, the output module 332 may communicate communication data 339 to the client computing devices (e.g., client computing devices 306(1) through 306(3) participating in a live viewing of the communication session). The communication data 339 may include video, audio, and/or other content data, provided by the output module 332 based on content 350 associated with the output module 332 and based on received session data 336.

As shown, the output module 332 transmits communication data 339(1) to client computing device 306(1), and transmits communication data 339(2) to client computing device 306(2), and transmits communication data 339(3) to client computing device 306(3), etc. The communication data 339 transmitted to the client computing devices can be the same or can be different (e.g., positioning of streams of content within a user interface may vary from one device to the next).

In various implementations, the device(s) 310 and/or the client module 320 can include GUI presentation module 340. The GUI presentation module 340 may be configured to analyze communication data 339 that is for delivery to one or more of the client computing devices 306. Specifically, the GUI presentation module 340, at the device(s) 310 and/or the client computing device 306, may analyze communication data 339 to determine an appropriate manner for displaying video, image, and/or content on the display screen 329(1) of an associated client computing device 306. In some implementations, the GUI presentation module 340 may provide video, image, and/or content to a presentation GUI 346 rendered on the display screen 329(1) of the associated client computing device 306. The presentation GUI 346 may be caused to be rendered on the display screen 329(1) by the GUI presentation module 340. The presentation GUI 346 may include the video, image, and/or content analyzed by the GUI presentation module 340.

In some implementations, the presentation GUI 346 may include a plurality of sections or grids that may render or comprise video, image, and/or content for display on the display screen 329. For example, a first section of the presentation GUI 346 may include a video feed of a presenter or individual, and a second section of the presentation GUI 346 may include a video feed of an individual consuming meeting information provided by the presenter or individual. The GUI presentation module 340 may populate the first and second sections of the presentation GUI 346 in a manner that properly imitates an environment experience that the presenter and the individual may be sharing.

In some implementations, the GUI presentation module 340 may enlarge or provide a zoomed view of the individual represented by the video feed in order to highlight a reaction, such as a facial feature, the individual had while viewing the presenter. In some implementations, the presentation GUI 346 may include a video feed of a plurality of participants associated with a meeting, such as a general communication session. In other implementations, the presentation GUI 346 may be associated with a channel, such as a chat channel, enterprise teams channel, or the like. Therefore, the presentation GUI 346 may be associated with an external communication session that is different than the general communication session.

Figure 4:
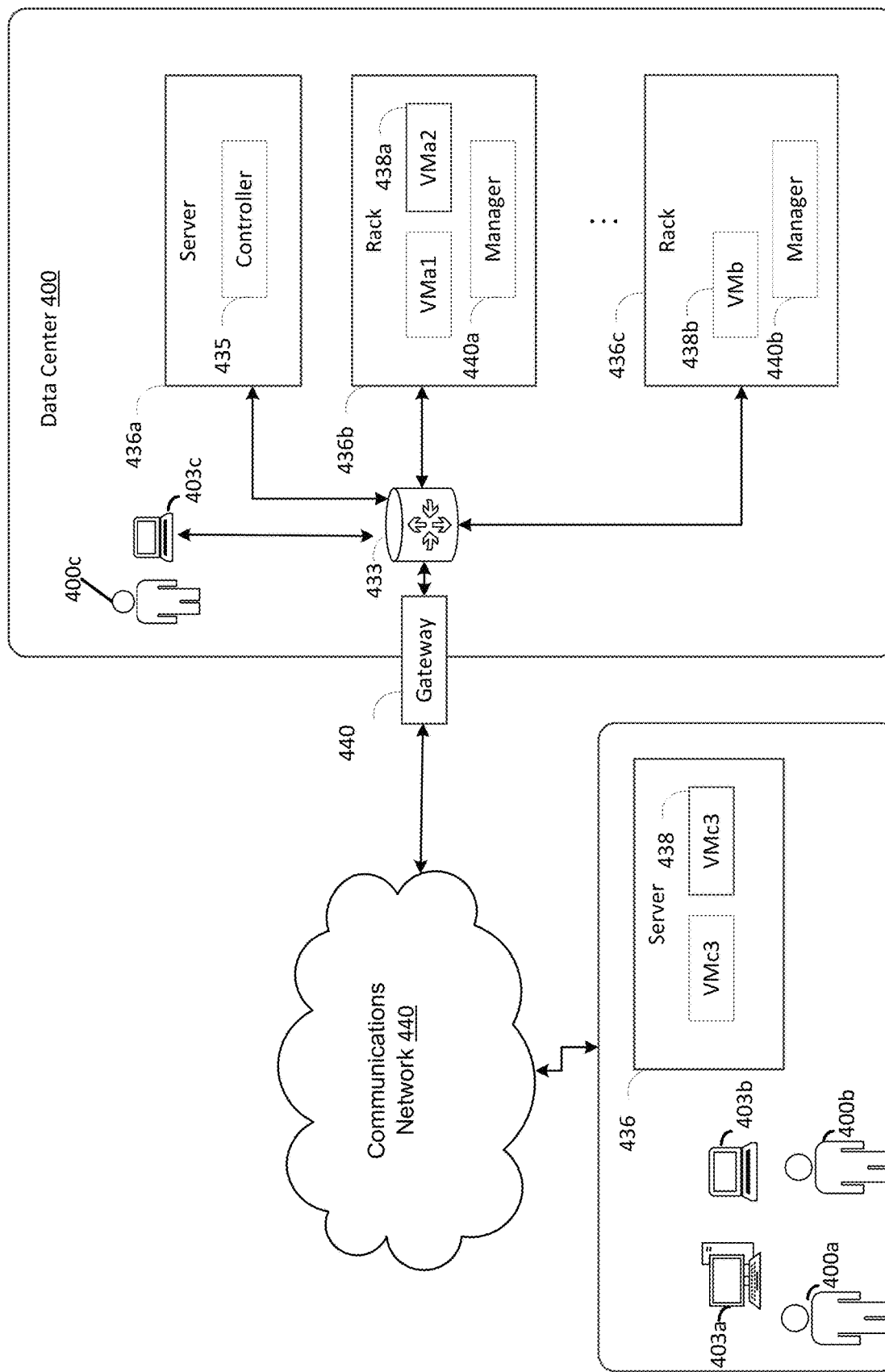
FIG. 4 is a diagram illustrating a data center and local resources in accordance with the present disclosure.

FIG. 4 illustrates an example computing environment in which the embodiments described herein may be implemented. FIG. 4 illustrates a data center 400 that is configured to provide computing resources to users 400a, 400b, or 400c (which may be referred herein singularly as "a user 400" or in the plural as "the users 400") via user computers 403a, 403b, and 403c (which may be referred herein singularly as "a computer 403" or in the plural as "the computers 403") via a communications network 440. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond to data center 100 of FIG. 1, or service provider 200 of FIG. 2, or edge site 250 of FIG. 2. Data center 400 may include servers 436a, 436b, and 436c (which may be referred to herein singularly as "a server 436" or in the plural as "the servers 436") that may be standalone or installed in server racks, and provide computing resources available as virtual machines 438a and 438b (which may be referred to herein singularly as "a virtual machine 438" or in the plural as "the virtual machines 438"). The virtual machines 438 may be configured to execute applications such as Web servers, application servers, media servers, database servers, and the like. Other resources that may be provided include data storage resources (not shown on FIG. 4) and may include file storage devices, block storage devices, and the like. Servers 436 may also execute functions that manage and control allocation of resources in the data center, such as a controller 435. Controller 435 may be a fabric controller or another type of program configured to manage the allocation of virtual machines on servers 436.

Referring to FIG. 4, communications network 440 may, for example, be a publicly accessible network of linked networks and may be operated by various entities, such as the Internet. In other embodiments, communications network 440 may be a private network, such as a corporate network that is wholly or partially inaccessible to the public.

Communications network 440 may provide access to computers 403. Computers 403 may be computers utilized by users 400. Computer 403a, 403b or 403c may be a server, a desktop or laptop personal computer, a tablet computer, a smartphone, a set-top box, or any other computing device capable of accessing data center 400. User computer 403a or 403b may connect directly to the Internet (e.g., via a cable modem). User computer 403c may be internal to the data center 400 and may connect directly to the resources in the data center 400 via internal networks. Although only three user computers 403a, 403b, and 403c are depicted, it should be appreciated that there may be multiple user computers.

Computers 403 may also be utilized to configure aspects of the computing resources provided by data center 400. For example, data center 400 may provide a Web interface through which aspects of its operation may be configured through the use of a Web browser application program executing on user computer 403. Alternatively, a stand-alone application program executing on user computer 403 may be used to access an application programming interface (API) exposed by data center 400 for performing the configuration operations.

Servers 436 may be configured to provide the computing resources described above. One or more of the servers 436 may be configured to execute a manager 440a or 440b (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 438 on servers 436, for example.

It should be appreciated that although the embodiments disclosed above are discussed in the context of virtual machines, other types of implementations can be utilized with the concepts and technologies disclosed herein.

In the example data center 400 shown in FIG. 4, a network device 433 may be utilized to interconnect the servers 436a and 436*b*. Network device 433 may comprise one or more switches, routers, or other network devices. Network device 433 may also be connected to gateway 440, which is connected to communications network 440. Network device 433 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In many of the described communication systems, communications quality can suffer under deteriorating network conditions. For this reason, host end points for the communications systems may take packet loss/call drops into account for monitoring the health of their media sessions and implement a complex fault-tolerant (fail-safe) mechanism when service problems occur. Some applications may move (re-target) meetings from a conferencing server i.e., media processor (MP) running on one VM (host) to another VM (host) location. The mechanism may be triggered when the MP service is presumed failed/unresponsive This mechanism may be acceptable when issues originate on the host (e.g., VM reboot). However, there is insufficient context for the mechanism when the host end point is unhealthy/overloaded (e.g., experiencing high packet loss) or issues originate within the network due to failed segments or prolonged network congestion. Specifically, existing mechanisms lack 1) a clear signal indicating whether retargeting can improve the situation, and 2) indication of where to land the new MP so that retargeting can be successful. For example, if an MP instance were to move sessions from one VM (host) to another VM (host) in the same cluster/region, there is a chance that the underlying issue was a single point of failure (SPoF) for both hosts, in which case the re-targeting process will not yield the desired outcome (e.g., the issue could be on the Top of Rack (TOR), Software Load Balancer (SLB), edge router, peer autonomous system (ASN), etc.). The problem can take yet another form: a session experiencing degradation on the edge/ASN peering links can induce higher RTT and packet loss across a given network segment, but since these calls are distributed across many MPs, the packet losses on each individual MP server may be insufficient to trigger an alert needed to trigger re-targeting. Additionally, even an alert is triggered, the MC/MP itself cannot find an alternative path to egress at another edge point and restore quality service.

Figure 5A:
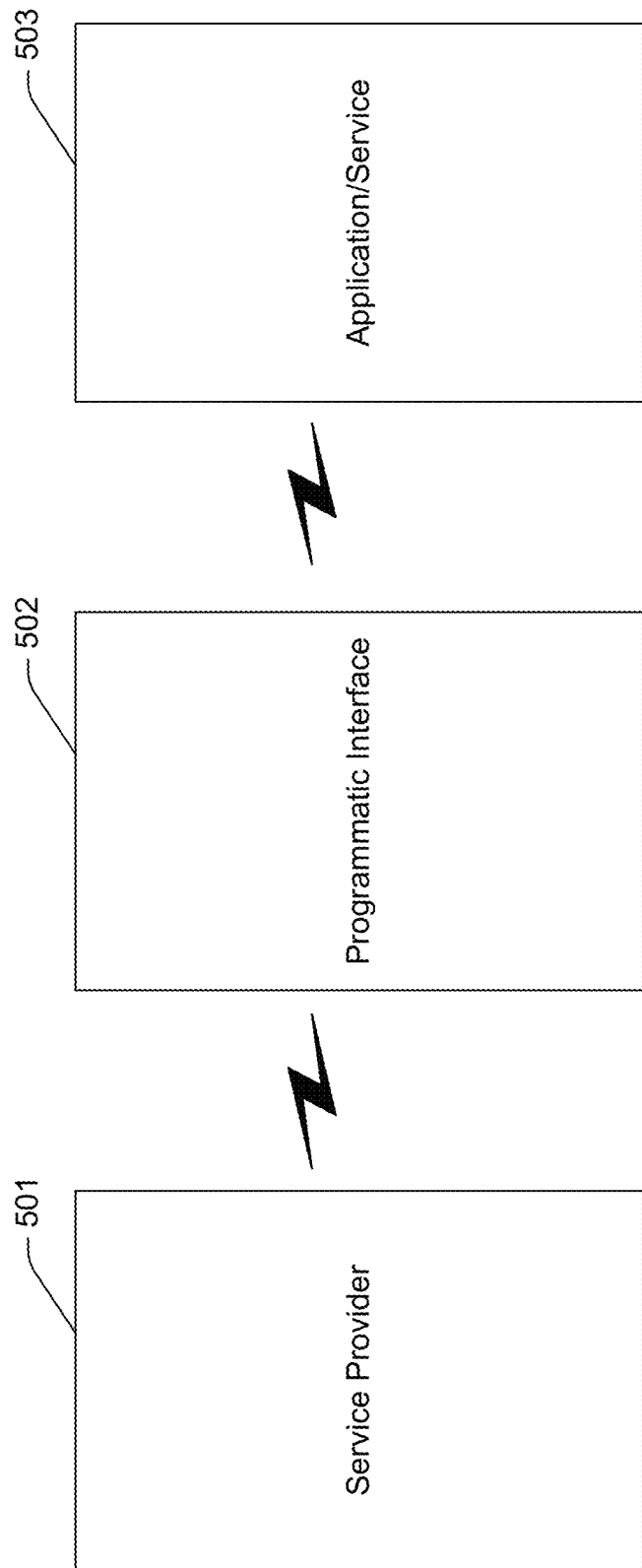
FIG. 5A is a diagram illustrating an architecture for providing failover in accordance with the present disclosure.

The disclosed embodiments provide an improved failover mechanism by providing signals that can enable a communications service to move the host endpoint and/or move the data path across the edge/peering point to ensure that quality of service is maintained during unplanned outages and overloaded network scenarios. By providing an application such as MS Teams a clear signal as to a safe endpoint that the service can move to, existing retargeting infrastructure can be leveraged to improve high availability objectives and customer experience with reduced cost and architectural changes. As shown in the example of FIG. 5A, a service provider 501 may provide a signal to an application or service 503 via programmatic interface 502.

Figure 5B:
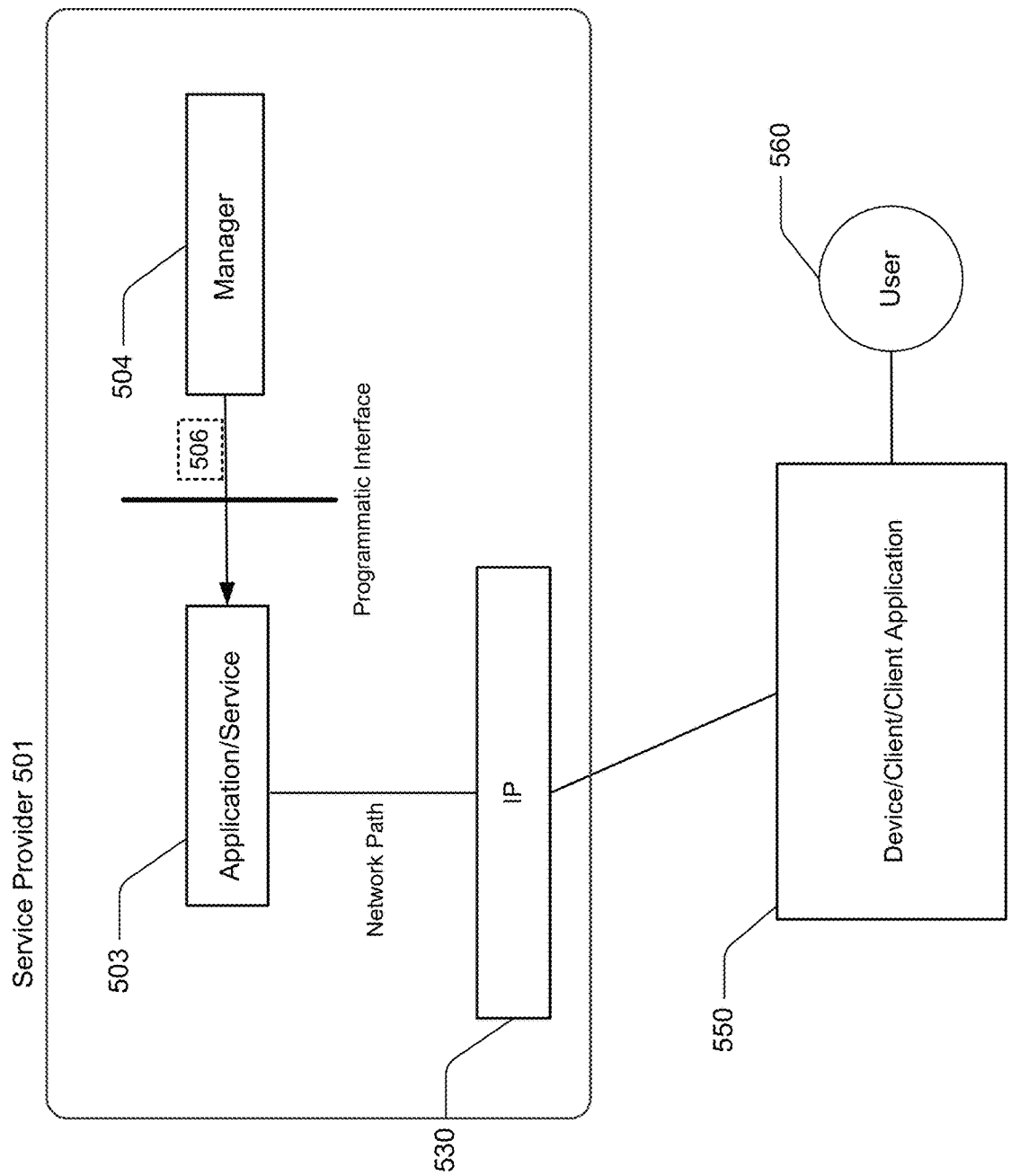
FIG. 5B is a diagram illustrating an architecture for providing failover in accordance with the present disclosure.

Determination of a signal to notify a service where to move for re-targeting is crucial for delivering a high-confidence, actionable signal. In one embodiment, the signal can be determined based on a combination of application-level metrics and network level metrics (e.g., bandwidth, loss, and health of the contention points—host and edge peering links). In the example of FIG. 5B, service provider 501 may host a service or application 503. The service provider 501 may provide a function such as manager 504 that may determine and provide signal 506. The signal 506 may provide actionable information regarding an IP address associated with an endpoint at service provider 501. The IP address may be accessible via a route or other gateway device 530 that is used by application or service 503 to provide media services to device/client/client application 550 that may be used by end user or client device 560.

Figure 5C:
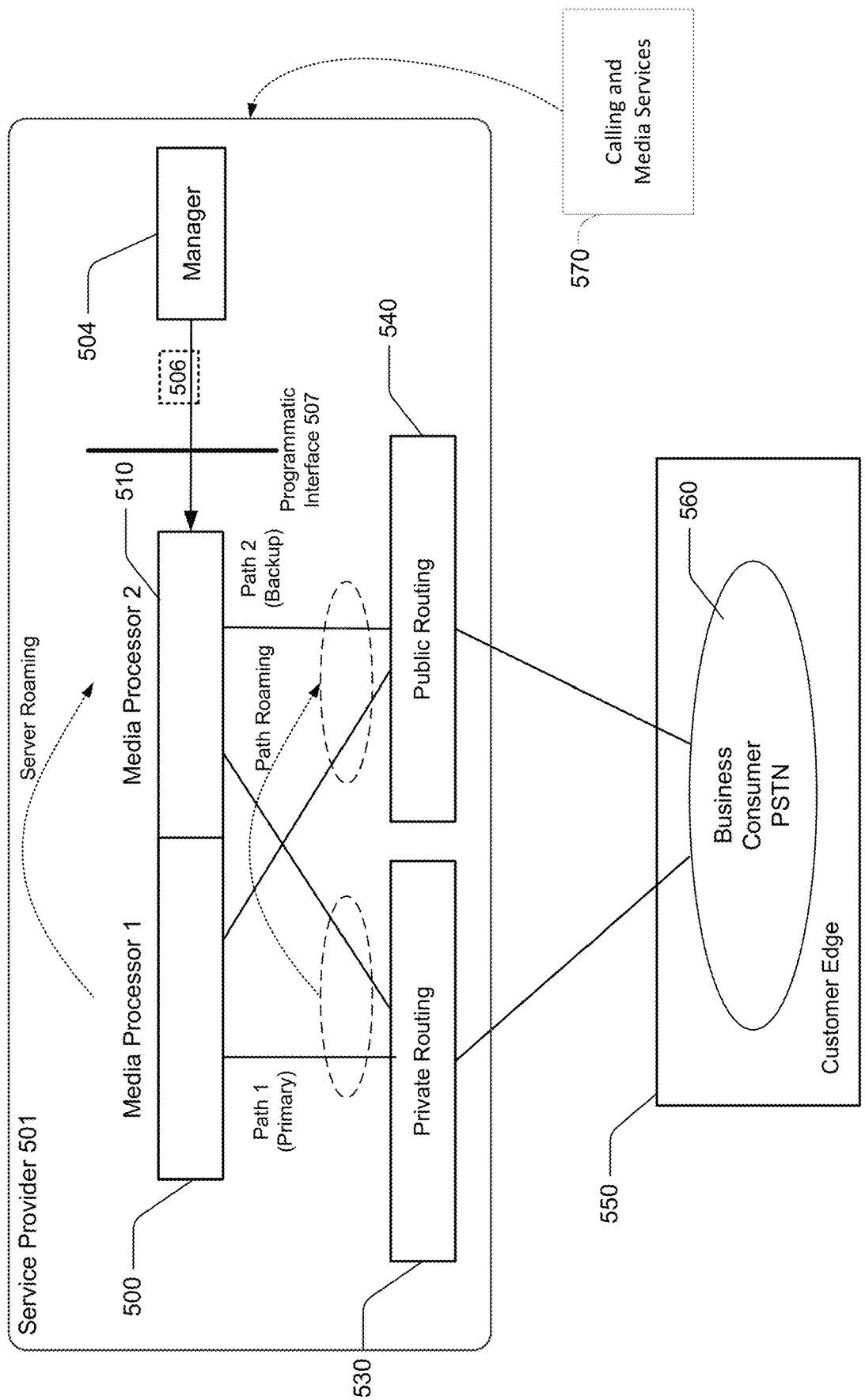
FIG. 5C is a diagram illustrating an architecture for providing failover in accordance with the present disclosure.

Such a signal 506 may enable the following two controls for the HA mechanism: (1) server roaming (re-target sessions to another host when the host is unhealthy i.e., from MP 1 to MP 2), and (2) path roaming (re-target sessions to a backup path when the primary path fails i.e., switch from path 1 to path 2 on MP 1), as illustrated in the example of FIG. 5C. As shown in FIG. 5C, a first media processor 1 (500) and second media processor 2 (510) may be instantiated on different virtual machines to provide primary and backup host capability. A first provider routing path 530 and public routing path 540 may provide primary and backup data paths. In this example, calling and media services 570 may be provided to the customer edge 550 which enables communications services 560 for business, consumer, and PSTN clients. In some embodiments, second media processor 2 (510) may be instantiated and/or activated when it is determined that the primary host has failed and that a backup host is needed. In other words, the second media processor 2 (510) need not be continuously active on the backup host and can be activated when needed. The secondary prefix may be identified and available for use if and when the backup host is needed, and in advance of the backup host being identified, instantiated and/or activated. The backup host may be identified and allocated from available computing resources at the service provider.

The two controls for server roaming and path roaming, when combined, can enable a re-targeting scenario where sessions may be moved from MP 1 (500) to MP 2 (510) and onto backup path 2 (540). A mechanism for enabling the backup path and selecting the next preferred edge site for the path when edge site isolation occurs can be provided. With these two control functions, impacted sessions can successfully bypass failed or overloaded segments of the infrastructure. In an embodiment, some or all of the control functions may be provided by manager 504. Signal 506 may be communicated by the manager 504 to the application or service such as media processor 1 (500) or media processor 2 (510). The signal 506 may indicate a switch or re-targeting to a second path of the two network paths 530 or 540 and a second unique IP address for the second path. The signal 506 may be communicated to the service or application via a programmatic interface 507. The service or application may be configured to maintain existing media communications sessions while switching between the first and second IP addresses.

In an embodiment, the described mechanism may have the ability to maintain two network paths between the end points. In an embodiment, each MP server (or equivalent) may maintain two or more public IP addresses. Additionally, the described mechanism may determine when the re-targeted path may resolve the issue, and determine that the re-targeted host can accommodate the capacity moved to it.

In one implementation, the service provider may provide the ability for a multipath selection mechanism and build out a mechanism for a customer-controlled high availability via routing multipath. For example, the service provider may enable selection between a private network via the ISP network (public internet). The selection can be triggered in case the primary path becomes unavailable (e.g., the edge site is down or performance is degraded due to congestion or other middle-mile/downstream ASN issues). The multipath selection mechanism provides the ability to configure two public IP addresses on a VM NIC or multiple NICs with a different routing type, egressing the cloud domain either closer to the user or the region. By leveraging multiple paths for failover across separate edge peering domains, the high availability (multipath selection) mechanism will typically find diverse paths between any source and destination nodes. Such path diversity can be effective against prolonged congestion and link failures across edge sites and downstream ASNs for improved service resilience and end-user experience.

FIG. 6 illustrates an example media processor (server) 6 in one embodiment of the present disclosure. Media processor (server) 630 may have three NICs, one for business communications 600 (e.g., MS Teams), PSTN 610, and consumer communications 620 (e.g., Skype). In other implementations, a server may be more or less NICs that are available for failover purposes.

For path roaming (failover) to circumvent the above-mentioned problems, in one embodiment the following operations and signal may be implemented:
  identify a set of primary prefixes (e.g., primary IP addresses) impacted for the application or service a region; in an embodiment, primary prefixes may be configured for provider (private) peering
  signal the prefixes that need mitigation (upon completing egress/ingress traffic engineering (TE))
  switch those VMs (e.g., media processors (MPs)) to secondary prefixes (e.g., secondary IP addresses); in an embodiment, secondary prefixes may be configured for ISP peering
  upon problem resolution, switch back to primary prefixes on the MPs
  there are two aspects to path control: path switching and path setup for the secondary prefixes between hosts and edge routers (via tunneled routing e.g., VXLAN)

Enablement of multipath may be accommodated with changes in protocol implementation in the way media sessions are established and signaled from client to server and vice-versa in the case of re-targeting. While the described multipath techniques may provide for failover, the implementation on the client side (e.g., equipping servers with two or more interfaces and incorporating host end point extensions) can enable further use cases where multiple paths can be used for resource pooling to improve the quality of high-rate video transfers. A plug-in on the network side of the application that enables selection of paths for Real-time Transport Protocol (RTP) media flows may provide the basis for enabling full multipath RTP extensions, where traffic of one media flow may be split across multiple sub-flows.

Some applications may re-target established media sessions to a new MP server when a planned outage is scheduled, for example for host OS updates Similar interactions with the underlying network for unplanned outages or health degradation on the hosts may enable implementations for improved delivery of media applications. For server roaming, an application may check if a node is healthy and if the node has sufficient bandwidth available to accommodate the load. In some embodiments, node health and the node's available capacity may be available as a signal.

Each of the signals needed for path roaming and server roaming execution can be computed by monitoring critical processes on the edge routers and hosts. Additionally, other signals pertaining to network or link state, including load characteristics and packet drops, may be used to make this determination. In some embodiments, cross-correlation of application and network level metrics can be used.

In one example, a media processor (MP) service may be configured with three NICs that each serve different RTC connections. As illustrated in FIG. 6, the primary NIC (NIC 1) may be configured for business traffic 600, the secondary NIC (NIC 2) may be configured for consumer traffic 620, and the 3rd NIC may be configured for PSTN traffic 610. One public IP (PIP) address may be allocated to each NIC.

Transfer of media traffic between communicating peers (MP server and client) may be enabled using Real-time Transport Protocol (RTP) protocol and end to end QoS monitoring for the media sessions along with control functions enabled by the associated Real-Time Transport Control Protocol (RTCP) protocol. Sessions may be established by a signaling protocol (e.g., HTTPS) which may also use Session Description Protocol (SDP) to specify the parameters for the sessions. Media protocol implementations (RTP/RTCP/SDP) assume a single path between the end points and one-to-one mapping between the public IP and NIC. The client typically has one IP address (single interface) for the server. Currently, if the NIC is configured with two IPs (interfaces) for multiple routing types, there is no way for the server to communicate this to a client at session startup and for re-targeting. In an embodiment, host end points may implement an extension to integrate multipath for failover purposes. In some embodiments, implementation of the disclosed techniques may include extension of the IP address space, and configuration of two or more IPs for the NIC with different routing options.

In one embodiment, existing client-server logic may be used for interface (IP address) discovery at session startup and re-targeting. The client typically knows one network interface for the server at a time (i.e., one path is active at a time). In an embodiment, two IPs may be active on the same interface—one for each path (primary via service provider internal peering and secondary via ISP (internet) peering). Upon launch, the MP server may discover the IPs by querying an API which may be the mechanism that is used to discover the single IP. Upon a specified trigger point, the server may move meetings to the second IP from the first IP. This may be similar logic as if re-targeting to a second server but re-targeting on the second IP of the same NIC (server). Re-targeting or advertisement of the new interface for the media sessions in existing systems may occur through Session Description Protocol (SDP) Offer/Answer (out-of-band). Server roaming, or in-band call establishment/re-targeting via RTP and/or RTCP, provides a faster response.

In some embodiments, the client-server logic can be configured for the client to implement two IPs/interfaces for a server, or for the server to implement two or more IPs/interfaces for the client at any given time. This enables one or both client and/or server to make a path selection based on internal monitoring logic, or to enable multipath for the purpose of balancing media traffic across multiple paths. As an example, client-roaming may be performed when a user moves from WiFi/WLAN to a cellular network to enable a smooth transition via the second path. The client may find the second interface and communicate the second interface to the server, which always knows one IP for the client.

In one embodiment, a platform may be provided for real-time media use case scenarios. By equipping the media server with 2 IPs/interfaces (or more), multipath media transmission use cases may be enabled other than for a failover when the primary path becomes unavailable. In some embodiments, use cases may be enabled where a multihomed server is configured to deliver services to a multihomed client via traffic (media flow) splitting across multiple available paths for the purpose of enhancing the media (video) quality. This can allow for maximizing throughput by balancing traffic load and aggregating capacity. Internal RTCP media monitoring may be extended to monitor the quality of media across each path. The disclosed embodiments account for a mechanism for path selection or packet scheduling on each path. MPRTP extensions may be implemented when multiple paths are used and media traffic is balanced across all paths.

At session start up or when new interfaces appear (i.e., re-targeting), interfaces can be advertised in-band (in RTP and/or RTCP) or out-of-band (in SDP). In-band call setup need not wait for a response from the other endpoint before sending media on the path, whereas out-of-band call setup would require at least one additional RTT for SDP offer/answer procedures to complete. Server roaming through in-band call setup is, therefore, desirable for a faster failover. Each time that the interfaces change on the server (e.g., due to either moving the node or the path), the interfaces may be advertised to the client and the most recently received advertisements may invalidate earlier ones.

Exposing signals for applications to consume and move end points or switch paths opens a plurality of options for new use cases and differentiation of business models. For example, a high availability (HA) service may be provided for premium traffic for communications sessions. Initially, a supported scenario can enable the MP to configure 2 IPs, discover the IP addresses, and switch the path with the existing mechanism based on a manual trigger. A path failover may be implemented to throttle the re-targeting rate. For example, newer calls may be switched to the secondary IP/NIC followed by a phased re-targeting for impacted calls. This may provide a communications service with the ability to use re-targeting to change the path for improved service resilience. Such a capability may be implemented using static VXLAN provisioning. In further embodiments, VXLAN overlay for premium traffic may be implemented as a way to maximize availability.

In an embodiment, the ability to configure a routing type option for each public IP address additionally provides a way for regulating the Internet backhaul cost and optimization of the cost-performance curve. For example, Internet-based routing can be selected for cost savings for some types of workloads that can be provided at a lower charging model. In one embodiment, a subset of prefixes may be moved to Internet-based routing which can enable comparison of an ISP latency map and a service provider/private network latency map and overall performance deltas. Based on the comparison, lower cost services may be moved to Internet-based routing for cost savings. A static selection model may be implemented to select the routing type based on a specific traffic type. Alternatively, a dynamic selection mechanism may be implemented.

Figure 7:
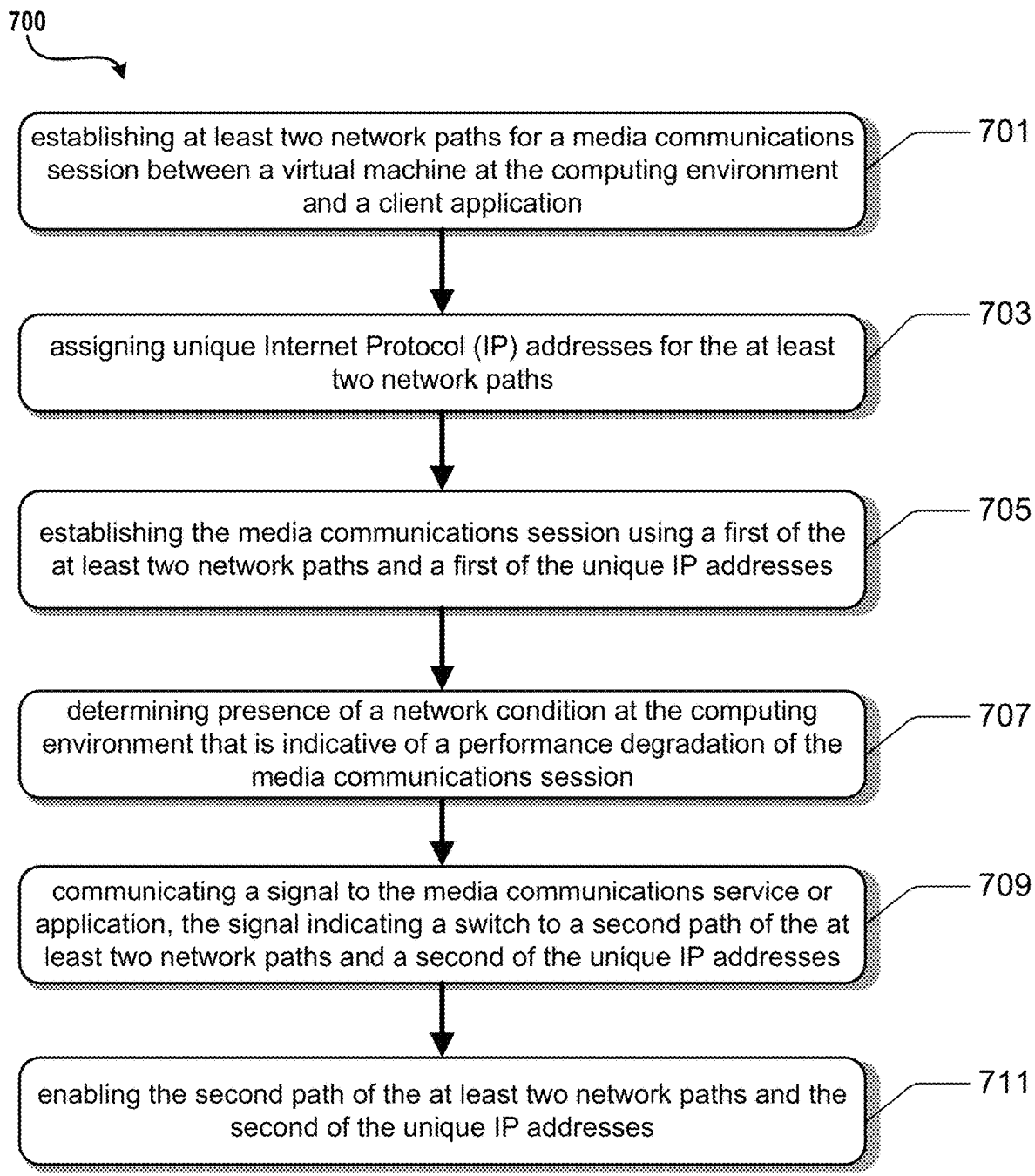
FIG. 7 is a flowchart depicting an example procedure for providing failover in accordance with the present disclosure.

Turning now to FIG. 7, illustrated is an example operational procedure for implementing failover functionality in accordance with the present disclosure. Such an operational procedure can be provided by one or more components illustrated in FIGS. 1 through 6. The operational procedure may be implemented in a computing environment a plurality of computing and storage devices configured to provide media communications services by a plurality of virtual machines hosted on the plurality of computing and storage devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 7, operation 701 identifying at least two network paths for a media communications session between a virtual machine at the computing environment and a client application.

Operation 701 may be followed by operation 703. Operation 703 illustrates assigning unique Internet Protocol (IP) addresses for the at least two network paths.

Operation 703 may be followed by operation 705. Operation 705 illustrates establishing the media communications session using a first of the at least two network paths and a first of the unique IP addresses.

Operation 705 may be followed by operation 707. Operation 707 illustrates based on application and network metrics at the computing environment, determining presence of a network condition at the computing environment that is indicative of a performance degradation of the media communications session.

Operation 707 may be followed by operation 709. Operation 709 illustrates in response to the determination, communicating a signal to the media communications service or application. In an embodiment, the signal indicates a switch to a second path of the at least two network paths and a second of the unique IP addresses. In an embodiment, the signal is communicated to the media communications service or application via a programming interface and the media communications service or application is configured to maintain the media communications session while switching between the first and second IP addresses.

Operation 709 may be followed by operation 711. Operation 711 illustrates enabling the second path of the at least two network paths and the second of the unique IP addresses.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 8:
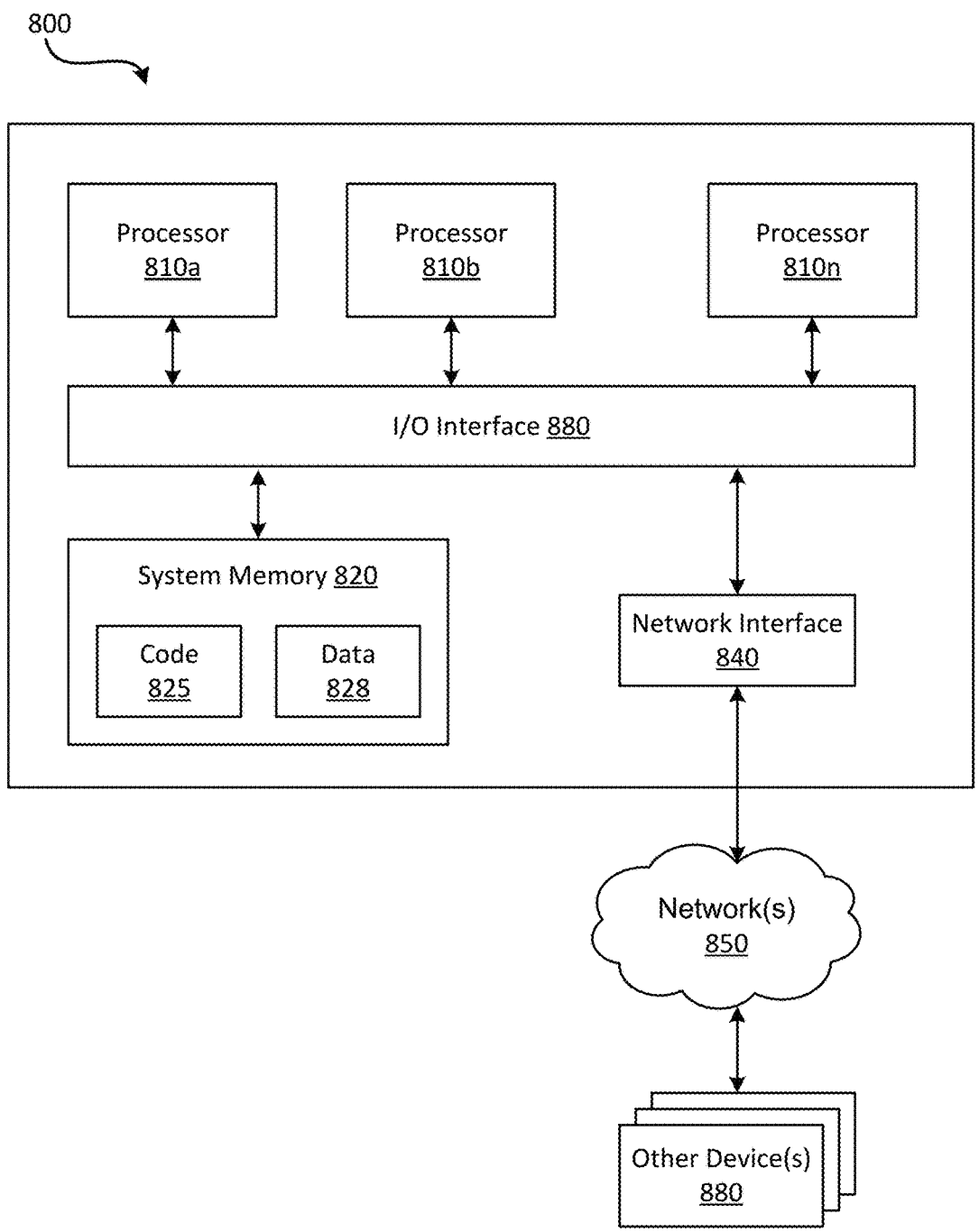
FIG. 8 is an example computing system in accordance with the present disclosure.

FIG. 8 illustrates a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 88 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 88 may be configured to store instructions and data accessible by processor(s) 810. In various embodiments, system memory 88 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 828.

In one embodiment, I/O interface 830 may be configured to coordinate I/O traffic between the processor 810, system memory 88, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 880 attached to a network or network(s) 880, such as other computer systems or devices as illustrated in FIGS. 1 through 5, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for implementing failover functionality in a computing environment comprising a plurality of computing and storage devices configured to provide a media communications service or application by a plurality of virtual machines hosted on the plurality of computing and storage devices, the method comprising:
  identifying at least two network paths for a media communications session between a virtual machine at the computing environment and a client application;
  assigning unique Internet Protocol (IP) addresses for the at least two network paths;
  establishing the media communications session using a first of the at least two network paths and a first of the unique IP addresses;
  based on application and network metrics at the computing environment, determining presence of a network condition at the computing environment that is indicative of a performance degradation of the media communications session;
  in response to the determination, communicating a signal to the media communications service or application, the signal indicating a switch to a second path of the at least two network paths and a second of the unique IP addresses, wherein the signal is communicated to the media communications service or application via a programming interface and the media communications service or application is configured to maintain the media communications session while switching between the first and second IP addresses; and
  enabling the second path of the at least two network paths and the second of the unique IP addresses.

Clause 2: The method of clause 1, wherein the switch to the second path of the at least two network paths comprises switching host computing devices of the computing environment.

Clause 3: The method of any of clauses 1-2, wherein the host computing devices are media processor servers.

Clause 4: The method of any of clauses 1-3, wherein the switch to the second path of the at least two network paths comprises switching network paths for a virtual machine endpoint of the media communications session.

Clause 5: The method of any of clauses 1-4, wherein the first of the at least two network paths is a private network path, and the second of the at least two network paths is a public Internet path.

Clause 6: The method of any of clauses 1-5, wherein the first of the at least two network paths is associated with a primary prefix for the media communications session.

Clause 7: The method of clauses 1-6, wherein the second of the at least two network paths is associated with a secondary prefix for the media communications session.

Clause 8: The method of any of clauses 1-7, further comprising switching to the first of the at least two network paths and the first of the unique IP addresses in response to resolution of the network condition at the computing environment that is indicative of the performance degradation of the media communications session.

Clause 9: A system comprising:
  one or more processors; and
  a memory in communication with the one or more processors, the memory having computer-readable instructions stored thereupon that, when executed by the one or more processors, cause the system to perform operations comprising:
  establishing a media communications session using a first of at least two network paths and a first unique IP address for the first of at least two network paths, the media communications session established in a computing environment comprising a plurality of computing devices configured to provide media communications services by a plurality of virtual machines hosted on the plurality of computing and storage devices;
  receiving, from the computing environment via a programming interface, a signal indicating a switch to a second path of the at least two network paths and a second of the unique IP addresses; and
  enabling the second path of the at least two network paths and the second of the unique IP addresses while maintaining the media communications session during switching between the first and second IP addresses.

Clause 10: The system of clause 9, wherein the at least two network paths are used for resource pooling to improve quality of media transfer.

Clause 11: The system of any of clauses 9 and 10, wherein traffic of a media flow of the media communications session is split across multiple sub-flows.

Clause 12: The system of any clauses 9-11, wherein the second path of the at least two network paths establishes the media communications session on a media processing server.

Clause 13: The system of any of clauses 9-12, wherein the media processing server has two or more network interfaces.

Clause 14: A computer-readable storage medium having computer-executable instructions stored thereupon which, when executed by one or more processors of a computing device, cause the computing device to:
  establishing at least two network paths for a media communications session between an application or media communications service hosted on a virtual machine executing at a computing environment and a client application, wherein the at least two network paths are diverse paths;

assigning unique Internet Protocol (IP) addresses for the at least two network paths;

establishing the media communications session using a first of the at least two network paths and a first of the unique IP addresses;

monitoring metrics that are indicative of network conditions or workload of computing devices running the virtual machine;

based on the monitoring of the metrics, determining that network conditions or workload of computing devices running the virtual machine are causing performance degradation of the media communications session;

in response to the determination, communicating a signal to the application or media communications service indicating a switch to a second path of the at least two network paths and a second of the unique IP addresses, wherein the signal is communicated to the application or media communications service via a programming interface and an application or media communications service is configured to maintain the media communications session while switching between the first and second IP addresses; and enabling the second path of the at least two network paths and the second of the unique IP addresses.

Clause 15: The computer-readable storage medium of clause 14, wherein the at least two network paths are used for resource pooling to improve quality of media transfer.

Clause 16: The computer-readable storage medium of any of clauses 14 and 15, wherein the at least two network paths are used for resource pooling to improve quality of media transfer.

Clause 17: The computer-readable storage medium of any of the clauses 14-16, wherein the second path of the at least two network paths establishes the media communications session on a new media processing server.

Clause 18: The computer-readable storage medium of any of the clauses 14-17, wherein media processing servers have two or more network interfaces.

Clause 19: The computer-readable storage medium of any of the clauses 14-18, wherein the switch to a second path of the at least two network paths comprises switching host computing devices of the computing environment.

Clause 20: The computer-readable storage medium of any of the clauses 14-19, wherein the switch to a second path of the at least two network paths comprises switching network paths for a virtual machine endpoint of the media communications session.

Clause 21: A method for implementing failover functionality by a computing service provider providing a computing environment comprising a plurality of computing devices configured to provide application layer services by a plurality of virtual machines hosted on the plurality of computing devices, the method comprising:

establishing at least two network paths for a media communications session for an application hosted on a plurality of virtual machines executing at the computing environment, the virtual machines hosting one or more microservices for managing the media communications session, wherein the at least two network paths are diverse paths;

assigning unique public Internet Protocol (IP) addresses for each of the at least two network paths;

establishing the media communications session using a first of the at least two network paths and a first of the unique public IP addresses;

monitoring, metrics that are indicative of network conditions or workload of computing devices running the virtual machine that is hosting the one or more microservices;

based on the monitored metrics, determining that the network conditions or the workload of the computing devices running the virtual machine are causing a performance degradation of the media communications session;

in response to the determination that the network conditions or the workload of the computing devices running the virtual machine are causing the performance degradation of the media communications session, communicating, via a programming interface, a signal to the application indicating the performance degradation, the second path of the at least two network paths, and the second of the unique public IP addresses; and enabling transfer of the media communications session to the second path of the at least two network paths and the second of the unique public IP addresses; and causing the application to maintain the media communications session while switching between the first and second IP addresses.

The invention claimed is:

1. A method for implementing failover functionality in a computing environment comprising a plurality of virtual machines hosted on a plurality of computing and storage devices, the method comprising:

identifying at least two network paths for a communications session between a virtual machine at the computing environment and a client application;

assigning unique network addresses for the at least two network paths;

establishing the communications session using a first of the at least two network paths and a first of the unique network addresses;

based on metrics at the computing environment, determining presence of a network condition at the computing environment that is indicative of a performance degradation of the communications session;

in response to the determination, communicating a signal indicating a switch to a second path of the at least two network paths and a second of the unique network addresses, wherein the communications session is maintained while switching between the first and second unique network addresses; and enabling the second path of the at least two network paths and the second of the unique network addresses.

2. The method of claim 1, wherein the switch to the second path of the at least two network paths comprises switching host computing devices of the computing environment.

3. The method of claim 2, wherein the host computing devices are media processor servers.

4. The method of claim 1, wherein the switch to the second path of the at least two network paths comprises switching network paths for a virtual machine endpoint of the communications session.

5. The method of claim 4, wherein the first of the at least two network paths is a private network path, and the second of the at least two network paths is a public Internet path.

6. The method of claim 1, wherein the first of the at least two network paths is associated with a primary prefix for the communications session.

7. The method of claim 6, wherein the second of the at least two network paths is associated with a secondary prefix for the communications session.

8. The method of claim 1, further comprising switching to the first of the at least two network paths and the first of the unique network addresses in response to resolution of the network condition at the computing environment that is indicative of the performance degradation of the communications session.

9. A system comprising:
one or more processors; and
a memory in communication with the one or more processors, the memory having computer-readable instructions stored thereupon that, when executed by the one or more processors, cause the system to perform operations comprising:
establishing a communications session using a first of at least two network paths and a first unique network address for the first of at least two network paths, the communications session established in a computing environment comprising a plurality of computing devices configured to provide communications services by a plurality of virtual machines hosted on the plurality of computing and storage devices;
receiving, from the computing environment via a programming interface, a signal indicating a switch to a second path of the at least two network paths and a second of the unique network addresses; and
enabling the second path of the at least two network paths and the second of the unique network addresses while maintaining the communications session during switching between the first and second unique network addresses.

10. The system of claim 9, wherein the at least two network paths are used for resource pooling to improve quality of data transfer.

11. The system of claim 10, wherein traffic of a data flow of the communications session is split across multiple subflows.

12. The system of claim 11, wherein the second path of the at least two network paths establishes the communications session on a data processing server.

13. The system of claim 12, wherein the data processing server has two or more network interfaces.

14. A computer-readable storage medium having computer-executable instructions stored thereupon which, when executed by one or more processors of a computing device, cause the computing device to perform operations comprising:
establishing at least two network paths for a communications session between an application or communications service hosted on a virtual machine executing at a computing environment and a client application, wherein the at least two network paths are diverse paths;
assigning unique network addresses for the at least two network paths;
establishing the communications session using a first of the at least two network paths and a first of the unique network addresses;
monitoring metrics that are indicative of network conditions or workload of computing devices running the virtual machine;
based on the monitoring of the metrics, determining that network conditions or workload of computing devices running the virtual machine are causing performance degradation of the communications session;
in response to the determination, communicating a signal to the application or communications service indicating a switch to a second path of the at least two network paths and a second of the unique network addresses, wherein the signal is communicated to the application or communications service via a programming interface and the application or communications service is configured to maintain the communications session while switching between the first and second unique network addresses; and
enabling the second path of the at least two network paths and the second of the unique network addresses.

15. The computer-readable storage medium of claim 14, wherein the at least two network paths are used for resource pooling to improve quality of data transfer.

16. The computer-readable storage medium of claim 15, wherein the at least two network paths are used for resource pooling to improve quality of data transfer.

17. The computer-readable storage medium of claim 15, wherein the second path of the at least two network paths establishes the communications session on a new data processing server.

18. The computer-readable storage medium of claim 14, wherein data processing servers have two or more network interfaces.

19. The computer-readable storage medium of claim 18, wherein the switch to a second path of the at least two network paths comprises switching host computing devices of the computing environment.

20. The computer-readable storage medium of claim 14, wherein the switch to a second path of the at least two network paths comprises switching network paths for a virtual machine endpoint of the communications session.

* * * * *